United States Patent Office 3,375,015
Patented Mar. 26, 1968

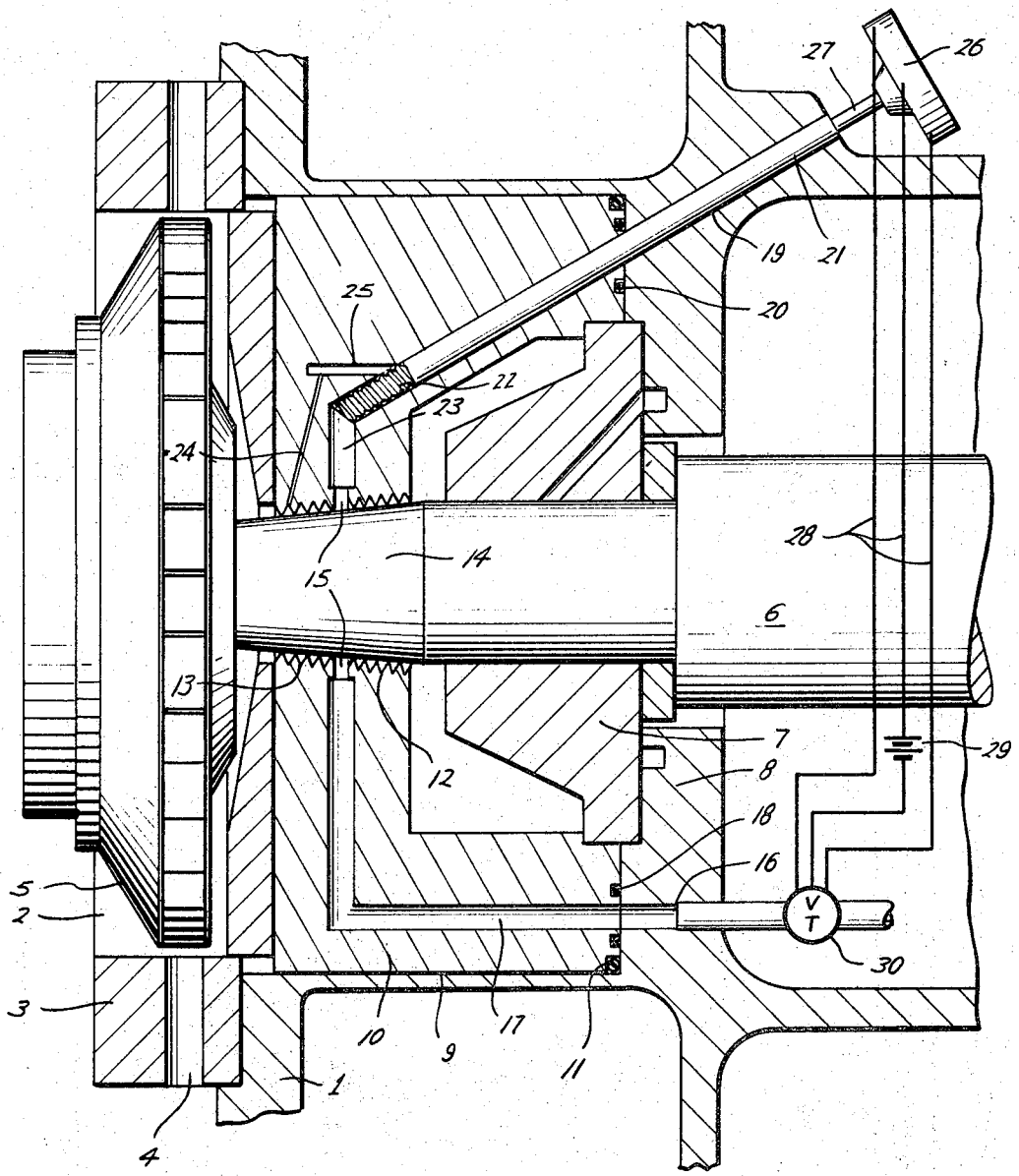

3,375,015
SHAFT SEAL EMPLOYING SEAL GAS WITH MEANS FOR INDICATING PROPER FLOW THEREOF
Judson S. Swearingen, 500 Bel Air Road, Los Angeles, Calif. 90024
Filed Sept. 30, 1966, Ser. No. 583,186
9 Claims. (Cl. 277—3)

This invention relates to rotary shaft seals for sealing about a shaft passing through a wall or the like and of the type sometimes referred to as a labyrinth seal in which there is no mechanical contact between the shaft and the opening through which it passes but a clearance is provided therebetween of as small a degree as practicable and a fluid is introduced at an intermediate point in such clearance to seal the same against leakage of the retained fluid from one side of the wall through the clearance toward the other. The present invention is peculiarly adapted to such rotary shaft seals in which the retained fluid is normally at a temperature different from that of an available sealing fluid. One example of such situation is in low temperature rotating machinery such as expansion turbines. However, it is also applicable to situations in which the retained gas is hot instead of cold and to compressors and other devices as well as to turboexpanders.

In such machines there is a need for an efficient shaft seal to prevent the escape of the low or high temperature gas being expanded or processed in the machine, and to prevent the entry of air or other foreign materials such as lubricating oil into the interior of the machine, thus contaminating the gas being expanded therein.

Various means of coping with this problem have been employed in the past. One of these involved providing a fixed clearance and accepting the escape of gas from the processing vessel. Another involved injecting a lubricant such as oil into the clearance at an intermediate point in quantity sufficient to supply all the leakage through the clearance between that point and the extremity of the clearance opposite the retained gas and providing a means between the point of injection of such lubricant and the body of retained gas whereby excess lubricant can be drained out so as to prevent it from contaminating the body of retained gas. Still another included using a sealing fluid in a manner similar to that just stated but in which the sealing fluid is compatible with the retained gas so that it will not objectionably contaminate the same if too much sealing fluid is introduced. It has been the objective in those instances employing an extraneous sealing fluid introduced into the clearance to regulate the flow thereof so that it will supply all of the leakage from the point of its introduction to the exterior of the vessel and prevent leakage of the fluid retained and being processed, and avoiding excessive flow of such sealing fluid above that required to provide such a seal.

However, in no instance has a means been provided for effectively checking on the flow of sealing fluid so as to be able to determine at all times whether it is flowing at exactly the proper rate or whether its pressure is allowed to fall below that of the retained fluid in which event not enough sealing fluid would enter the clearance, or is allowed to become greater than that of the retained fluid in which event too much of the sealing fluid would enter the clearance.

It is an object of this invention to provide a seal of the general type employing a sealing fluid entering a clearance with a means for detecting the rate of flow of sealing fluid into the clearance as compared with that required for effecting a perfect seal so that the rate of flow of sealing fluid into the seal assembly may be regulated to provide a perfect seal without any excess of sealing fluid being introduced.

Another object of this invention is to provide a means involving a seal assembly of the type effecting a seal by means of sealing fluid introduced into a clearance wherein the flow of sealing fluid into the clearance may be adjusted and controlled to maintain it at exactly the rate of flow required to effect a complete seal without excess of such flow.

Other objects and advantages of this invention will become apparent from the following description taken in connection with the accompanying drawing wherein is set forth one embodiment of this invention.

In the drawing:

The single figure shows a cross section through a seal assembly constructed in accordance with this invention, the section being taken along the axis of the shaft about which the seal is provided but with the shaft shown in elevation along with a rotary member mounted on one end thereof.

In accordance with this invention as illustrated in the drawing and described hereinafter, the sealing fluid employed is a gas having suitable means for regulating its flow so as to adjust it to the appropriate volume of flow to effect a perfect seal without the introduction of excessive seal gas. The seal gas introduced is at a different temperature from that of the retained gas and in order to detect either a situation in which the seal gas is being introduced at an excessive rate and hence is flowing from its point of introduction toward the retained gas, or, conversely, in which the seal gas is being introduced at too slow a rate and as a result retained gas is flowing through the clearance toward the seal gas, a temperature sensitive device is located in the path of such flow. It follows that if the temperature indicated by such device is more nearly comparable to that of the retained gas, it will serve as an indication that the rate of introduction of seal gas is too slow and that the retained gas is leaking toward the point of introduction of the seal gas and consequently mixing therewith in leaking on out through the portion of the clearance supposedly sealed by the seal gas. On the other hand, if the temperature indicated by the temperature sensing device is more nearly that of the seal gas, it will serve as an indication that the seal gas is being introduced at such an excessive rate that it cannot all leak out toward the end of the seal opposite the retained gas and hence is flowing toward the body of retained gas.

For the purpose of providing a desirable point for sensing the temperature the present disclosure incorporates a bypass between two axially spaced points in the clearance between the point of introduction of the seal gas and the body of retained gas so that when flow takes place in either diretcion through the zone of the clearance between these two points part of such flow will also take place through the bypass and will affect the temperature sensitive device located in the bypass. Preferably the bypass is so restricted as to conduct only a minor part of the flow between the two spaced points indicated.

In order to provide a neutral point calibration for the temperature sensitive device such that when the neutral point is indicated by the device it will constitute an indication of exactly the proper rate of introduction of seal gas with no flow in either direction between such point and the body of retained gas, the wall in which the seal is located has a part between the body of retained gas and the temperature sensing device which has a substantially constant rate of heat transfer so that the temperature sensing device will at all times be subjected to heat transfer tending toward indication of the temperature of the retained gas. By the same token, it will at all times be affected to substantially a constant degree by the temperature of the seal gas at its point of introduction to the clearance. When no flow is taking place through the bypass the temperature indication thus should be constant at such neutral point, but when flow takes place in one direction through the bypass the temperature indication will change toward the temperature of the retained gas, while when flow takes place in the other direction through the bypass the temperature indication will move toward the indication of temperature of the introduced seal gas.

In order to provide automatic control of the seal gas flow it is possible to connect the temperature indicator by known means to a motor controlled throttle valve controlling the injection of seal gas.

Referring in detail to the drawing, there is shown at 1 a fragment of a wall of a pressure vessel adapted to retain under pressure a gas which may be undergoing some process or which may be merely retained for such other purpose as desired as, for example, providing an atmosphere for a processing of other materials. It is understood that the term "retained gas" as used herein means the gas retained on one side of such wall and intended to be held by the seal arrangement of this invention against flow through the wall to the opposite side thereof. The inside of the wall or vessel is generally designated at 2 as being the space containing the retained gas and in the instance illustrated this space is shown as containing a nozzle ring 3 mounted on the wall 1 and having radially directed nozzles 4 thereon for directing retained gas into the passageways of a turbine wheel 5. Such devices are many times operated under conditions in which the temperature of the retained gas will be quite low as compared with ordinary atmospheric temperatures for example, and this invention is especially adapted to use under such circumstances because of the ease with which a seal gas of a considerably different temperature from that of the retained gas may be provided. However, this invention is not limited to such a situation because the seal gas can be supplied at any desired temperature different from that of the retained gas by the simple process of preheating or precooling it so as to make possible its use in connection with the present invention. Also, the retained gas may be warmer than the seal gas as well as colder, and the vessel involved may be something quite different from a turbo-expander.

A turbine wheel 5 is shown in the drawing mounted on a shaft 6 passing through an opening in the wall 1 and supported on a bearing 7 carried in an offset portion of the wall as shown at 8, this portion being supported by an outboard projection from the wall as illustrated at 9. The outboard portion 8 and the projection 9 provide a housing for the seal arrangement and in this housing is carried a block 10 of suitable insulating material frequently referred to as a heat barrier, this block of material 10 actually supporting and carrying the non-rotary elements of the seal.

The heat barrier 10 is shown as snugly fitting within the housing 9 and may be sealed therein by any suitable means such as the O-ring 11.

Coaxially with the shaft 6 the heat barrier is provided with an opening which in the example shown is tapered and which is made up of two zones, an outer zone 12 most remote from the retained gas chamber 2 and an inner zone 13 closest to such retained gas chamber 2. At this point the heat barrier in effect forms part of the wall 1 and this opening in which the zones 12 and 13 are provided is of such a size as to surround with a slight clearance the correspondingly tapered zone 14 of the shaft 6. This clearance from a practical standpoint should be made as slight as manufacturing and operating tolerances will permit so as to minimize the necessity for large volumes of seal gas to flow therethrough in providing the effective seal.

Between the two zones 12 and 13 is an annular chamber 15 through which seal gas is introduced into the clearance between the shafts and the inner wall of the opening by way of a passageway 16 through the offset portion 8 of the wall, and a registering passageway 17 through the body of the heat barrier material 10.

Assuming that a retained gas exists in the space 2 under pressure exceeding that outboard of the heat barrier 10 so that it tends to flow through the clearance between the opening through the heat barrier and the shaft extending therethrough, and that seal gas is being introduced into the annular chamber 15, if the introduction of such seal gas be regulated to the proper rate so that it will be introduced at the exact rate at which it will leak out through the zone 12 of such clearance, none of the retained gas in the space 2 can escape through such zone since it will already be filled with seal gas, and no seal gas will flow toward the space 2.

A seal is provided for the prevention of leakage from the passageway 16 where it enters the heat barrier 10 by any suitable means such as an O-ring seal 18.

In accordance with this invention a temperature sensing device is positioned to sense and indicate the temperature of any flow taking place through the clearance zone 13 between the retained gas vessel interior 2 and the chamber 15 into which the seal gas is introduced, thereby to determine whether such flow consists of the retained gas flowing from the space 2 or seal gas flowing from the chamber 15.

In order to so locate the temperature sensing device a hole 19 is shown extending from the exterior of the offset portion of the wall 1 through the offset wall portion 8 and into the heat barrier block 10. The prevention of leakage into or from this hole 19 between the heat barrier 10 and the offset wall portion 8 is prevented by any suitable seal means such as the O-ring 20. In order to provide a continuous conduit from the exterior of the housing through the offset wall portion 8 and to the desired point within the heat barrier block 10 a tubular member 21 is press fitted into the opening 19 extending from the outer end thereof to a point fairly closely adjacent to the opening through the heat barrier where it embraces the shaft zone 14. This tube 21 is open at its outer end and closed at its inner end and preferably its exterior adjacent its inner end is provided with spiral grooves or threads 22, the crests of which fit fairly snugly within the opening 19 so that any flow longitudinally of the tube 21 but exteriorly thereof within the opening 19 adjacent the end of the tube 21 will be forced to follow a spiral path and will thus be held in thermal contact or heat exchange relation with the end portion of the tube 21 for a considerable period of time. The inner end of the opening 19 is connected to the chamber 15 by a suitable passageway such as 23.

In order to provide a bypass between the chamber 15 through which the seal gas from the conduits 16 and 17 enter the clearance between the shaft and the opening through the heat barrier 10, and another point between such chamber and the body of retained gas within the space 2, there is provided a hole 24 leading from a point between the chamber 15 and the inner end of the clearance, radially outwardly through the heat barrier block 10 to intersect with a hole 25 which leads into communication with the hole 19 at a position approximately at the upper end of the outer threaded portion 22 of the tube 21. Thus it will be seen that if the pressure within the clearance zone 13 at the point where the bore 24 connects therewith is greater than that of the seal gas as it enters the chamber 15, there will be flow of retained gas from within the space 2 along the clearance zone 13 toward the chamber 15. In such event there will also be a pressure differential between the lower end of the bore 24 where it communicates with the clearance zone 13 and the lower end of the opening 23 at the point where it communicates with the chamber 15, which in turn will cause a flow of gas up through the bore 24 and across through the hole 25 into the opening 19 adjacent the upper end of the threaded section 22, and thence downwardly along a spiral path to the lower end of such threaded section 22 and thence into the chamber 15. Such flow will be made up of the retained gas and, in passing along the threaded section 22, will be brought into heat exchange relationship with this threaded section so as to cause this threaded section to assume more nearly the temperature of the retained gas 2.

If on the contrary the pressure of the seal gas entering the chamber 15 be greater than that within the retained gas body in the chamber 2, flow will take place through the clearance in the opposite direction and likewise flow will take place through the bypass provided by the opening 23, the grooves in the threaded section 22, the hole 25, and the bore 24, in the reverse direction from that previously described. The gas thus flowing through the bypass will consist of seal gas at aproximately the temperature at which it entered the clearance, and will bring such gas into heat exchange relationship with the threaded lower end of the tube 21 tending to cause such tube to assume a temperature of the incoming seal gas.

On the other hand, if the pressure within the retained gas body 2 is the same as that within the seal gas entering the chamber 15, so that there is no pressure drop or gradient along the clearance zone 13, there will be no flow of gas in either direction along this zone and the entire pressure drop or gradient between the retained gas 2 and that existing exteriorly of the device will be taken along the clearance zone 12. This pressure drop will induce a given flow of seal gas which will constitute the entire flow of gas giving rise to the pressure gradient between the retained gas 2 and the exterior of the device. If the quantity of gas supplied to the chamber 15 from the passageways 16 and 17 be increased to greater than that necessary to produce the pressure gradient between the pressure in the retained gas 2 and that exteriorly of the device, the pressure within the chamber 15 will rise and produce a reverse pressure gradient between this chamber and the interior of the retained gas. This in turn will produce a flow of seal gas toward the body of retained gas which will result in contamination of the retained gas and is to be avoided. At the same time it will produce flow of seal gas around the threaded end 22 of the tube 21 and cause this tube to more nearly assume the temperature of the seal gas. If the quantity of seal gas being supplied to the chamber 15 be reduced below that just required to maintain pressure gradient between the retained gas and the exterior of the device, then the pressure in the chamber 15 will drop providing a pressure gradient between the retained gas 2 and the chamber 15 and causing flow of retained gas through the clearance in the zone 13. Flow of retained gas will also be produced through the bypass and around the threaded end 22 causing this threaded end to assume more nearly the temperature of the retained gas.

In order to sense the temperature of the threaded end 22 of the tube 21 and hence to sense the direction in which a pressure gradient exists between the retained gas and the seal gas and whether there is an excess or deficiency of seal gas being supplied, a temperature sensing device 26 has its projecting temperature sensing element 27 extending into the hollow interior of the tube 21 and into the lower end thereof within the threaded section 22. Thus the temperature sensing and indicating device 26 will reflect whether the seal gas supply is deficient as indicated by the temperature of the threaded section 22 being more nearly that of the retained gas, or whether the supply of seal gas is excessive as indicated by the temperature of the threaded section 22 being more nearly that of the seal gas.

The heat barrier block 10 which forms a part of the wall surrounding the shaft 6, although being of so-called insulating material, has a definite heat conductivity and will normally and constantly serve to conduct heat between the threaded section 22 and the body of retained gas so that the temperature of the body of retained gas will have a substantially constant effect on the threaded section 22 which, however, will be less than that which it has when a portion of it is bypassed and flows directly around such threaded section. Likewise, the temperature of the seal gas which will always be different from that of the retained gas, is constantly communicated through the material of the heat barrier block 10 to the threaded section 22. Thus with both the retained gas and the seal gas having a constant means for imposing their respective temperatures upon the threaded section 22 when no gas is flowing through the bypass 23-24-25, there will result a neutral temperature which will be reflected by the temperature indicator 26 when exactly the right amount of seal gas is being supplied to the chamber 15 so that there is no flow in either direction through the zone 13.

The temperature sensing and indicating device 26 may give a visual indication of the temperature so as to inform an observer whether the seal gas flow is exactly adequate, too great, or too little, in which event regulation of the gas flow may be accomplished manually or otherwise to produce the desired neutral temperature indication on the indicator 26. However, if desired in the interest of greater accuracy, the temperature indicator 26 may be provided with electrical control connections such as wires 28 for supplying power from a battery or other source of electricity 29 to control a throttle valve 30 in any suitable well known manner so that if the temperature sensed within the threaded section 22 be such as to indicate a flow of seal gas through the bypass and hence an excess of supply of seal gas, the result will be a partial closing of the throttle valve 30 to diminish such supply, while if the temperature sensed within the threaded section 22 be such as to indicate a flow of retained gas therethrough, the throttle valve 30 will be actuated to increase the flow of seal gas by such amount as to maintain the pressure within the chamber 15 at exactly the same value as the pressure of the retained gas 2. Thus a control may be automatically imposed upon the supply of seal gas to regulate it to the exact amount required at all times and prevent the loss of any processed gas or the contamination of the body of processed gas 2 with seal gas.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described what is claimed is:

1. In combination with a shaft, a wall having an opening therein through which said shaft extends, and a seal arrangement for preventing leakage of a retained gas from one side of said wall to the other through a clearance between said shaft and said wall, comprising means for introducing into the clearance between the ends of the opening a seal gas at a temperature different from that of the retained gas to seal the clearance against leakage of the retained gas therethrough, the improvement which comprises a temperature sensing device, and means responsive to a pressure differential between the retained gas and the seal gas at the point of its entry into said clearance to subject the sensing device to the effect of the temperature of either one of said gases having the greater pressure, whereby inadequacy of the pressure of the seal gas to prevent leakage of the retained gas will be shown by a temperature indication closer to the temperature of the retained gas and such predominance of the pressure of the seal gas as would cause flow thereof toward the retained gas will be shown by a temperature indication closer to the temperature of the seal gas.

2. The combination set forth in claim 1 in which the wall is the wall of a low temperature, high pressure gas retaining vessel and the shaft is a rotating shaft for carrying energy between a rotary element in said vessel and the exterior of the vessel, and the seal gas is at a higher temperature than the retained gas.

3. The combination set forth in claim 1 in which the improvement further comprises a heat transmitting part carried by the wall adjacent said opening and positioned to constantly transmit heat between the retained gas and said sensing device and between the seal gas entering said clearance and said sensing device, thereby establishing a neutral temperature indication by said device between the temperature of the seal gas supply and the retained gas when the retained and seal gas pressures are equal indicating no leakage of retained gas and flow of seal gas at a rate just sufficient to supply all gas leakage through said clearance in a direction away from said retained gas.

4. The combination set forth in claim 1 in which the means responsive to a pressure differential between said gases is a bypass between two axially spaced points in said clearance, both of which are within the zone between the retained gas end of said clearance and the point of entry of seal gas into said clearance, and said temperature sensing device has its sensing element exposed to the temperature effect of the gas in said bypass.

5. The combination set forth in claim 4 in which the bypass is restricted in cross section size to permit only a minor fraction of the flow through the clearance between the two ends of the bypass.

6. The combination set forth in claim 4 in which the improvement further comprises a heat transmitting part carried by the wall adjacent said opening and positioned to constantly transmit heat between the retained gas and said sensing device and between the seal gas entering said clearance and said sensing device, thereby establishing a neutral temperature indication by said device between the temperatures of the seal gas supply and the retained gas when the retained and seal gas pressures are equal indicating no leakage of retained gas and flow of seal gas at a rate just sufficient to supply all gas leakage through said clearance in a direction away from said retained gas.

7. The combination set forth in claim 1 in which the wall is the wall of a high temperature, high pressure gas retaining vessel and the shaft is a rotating shaft for carrying energy between a rotary element in said vessel and the exterior of the vessel, and the seal gas is at a lower temperature than the retained gas.

8. The combination set forth in claim 1 in which the wall is the wall of a turboexpander for expanding high pressure gas while causing it to do mechanical work, and the shaft is a rotating shaft for transmitting such mechanical work from the interior of the turboexpander to the exterior thereof.

9. The combination set forth in claim 1 in which the wall is the wall of a gas compressor for compressing gas from a lower pressure to a higher pressure and the rotating shaft is a shaft extending through the wall of the compressor for transmitting energy into the compressor and operating the same.

References Cited

UNITED STATES PATENTS

| 2,921,804 | 1/1960 | Jekat | 308—36.3 |
| 3,180,135 | 4/1965 | Cain et al. | 73—46 |

LOUIS R. PRINCE, *Primary Examiner.*

J. NOLTON, *Assistant Examiner.*